Feb. 16, 1971 W. G. WING 3,563,662
APPARATUS FOR SENSING MOVEMENT ABOUT A PLURALITY OF AXES
Filed June 13, 1966 2 Sheets-Sheet 1

INVENTOR.
WILLIS G. WING
BY
ATTORNEY

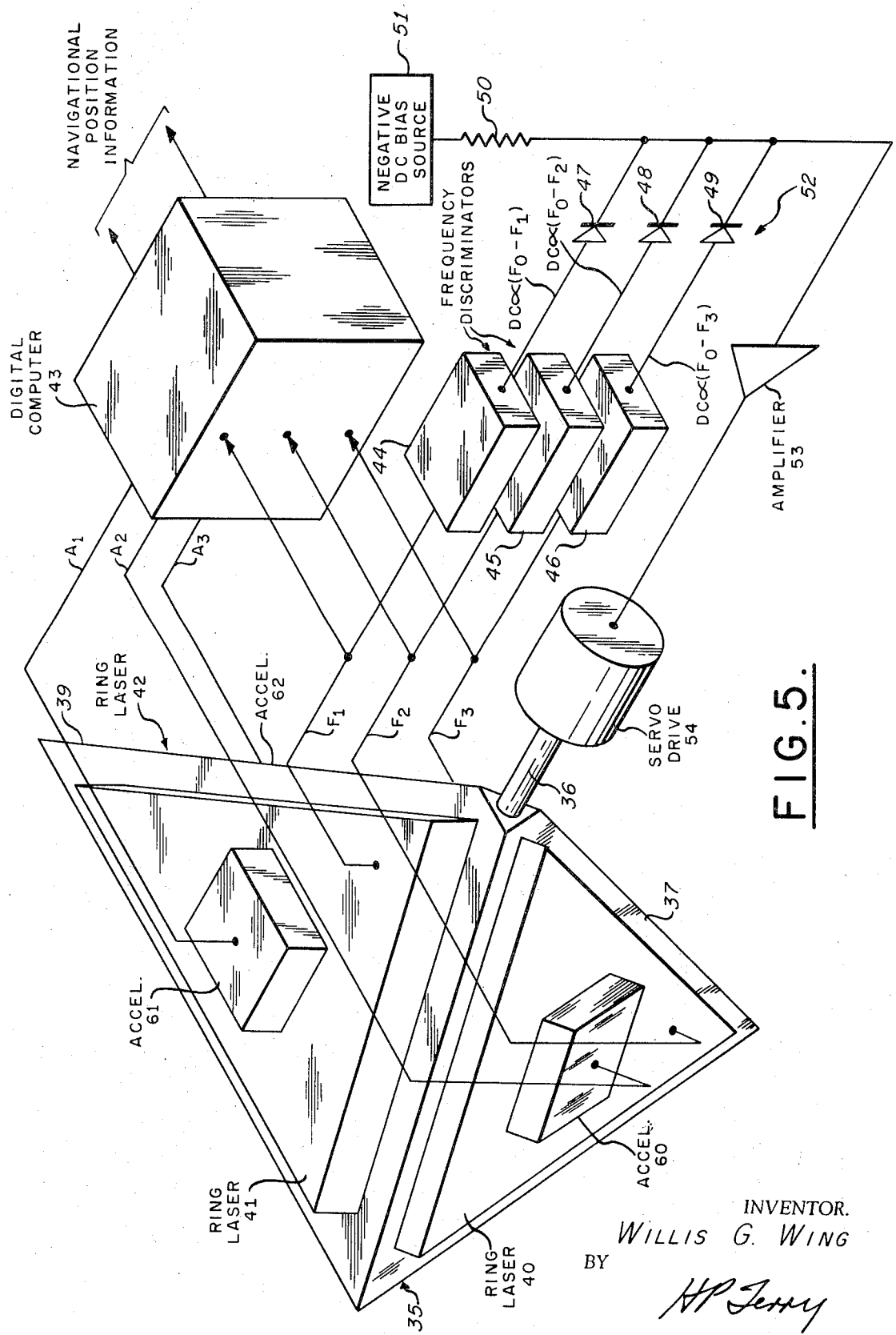

United States Patent Office 3,563,662
Patented Feb. 16, 1971

3,563,662
APPARATUS FOR SENSING MOVEMENT ABOUT A PLURALITY OF AXES
Willis G. Wing, Glen Head, N.Y., assignor to Sperry Rand Corporation, a corporation of Delaware
Filed June 13, 1966, Ser. No. 557,301
Int. Cl. G01b 9/02
U.S. Cl. 356—106
5 Claims

ABSTRACT OF THE DISCLOSURE

Apparatus for sensing movement about a plurality of axes including a like plurality of ring lasers mounted on surfaces defining a geometric figure, for example, an orthogonally mounted triad of ring lasers mounted on mutually perpendicular surfaces of a cube wherein the cube is rotated about one of its diagonal axes for imparting equal components of rotation to each of the ring lasers thereby eliminating mode locking and assuring that the beat frequency obtained by heterodyning the contra-rotating light waves is linearly related to the component of rotation rate measured parallel to the input axis of the respective ring laser.

---

The present invention relates to apparatus for sensing movement about a plurality of axes and to inertial navigation systems.

The present invention is particularly applicable to a strapped-down inertial navigation system. In conventional strapped-down inertial navigation systems, the inertial sensors such as gyroscopes and accelerometers are attached directly to the frame of the vehicle as contrasted with the more conventional inertial navigation systems in which the sensors are isolated from the vehicle frame by means of gimbal systems. In strapped-down inertial navigation systems, the gyroscopes measure three orthogonal components of vehicle angular velocity which are provided to a computer that continuously computes the attitude of the vehicle with respect to a stable coordinate system. The accelerometers provide measures of three orthogonal components of vehicle linear acceleration, preferably sensing the accelerations along the same axes as the angular velocities are sensed. The acceleration measures are also provided to the computer which has in its memory quantities that define the attitude of the vehicle with respect to a stable coordinate system and thus the computer can convert the measured acceleration components into acceleration components in the same stable coordinate system. The values of the three components of acceleration which have been computed are identical to those which would have been measured by a set of orthogonal accelerometers mounted on a conventional stable platform and aligned to the reference coordinate system and thus the navigation computation process can be solved in the same manner as though a conventional stable platform had been utilized.

The complexity and required accuracy of the computations in a strapped-down inertial navigation system have necessitated the use of a digital computer for the attitude information updating and for the conversion of measured accelerations from vehicle coordinates to stable coordinates and therefore inertial sensors having digital outputs are preferred.

Further, because the inertial sensors are not isolated from vehicle angular motions by a gimbal system, it is necessary that the angular velocity sensors be capable of accurately measuring angular velocities up to the maximum expected vehicle angular rates. At the same time they must also be capable of detecting extremely low angular rates, for example, angular rates in the order of one minute per hour for each nautical mile per hour of allowable navigational error. Considering the fact that vehicle angular rates may be as high as 240° per second, which for example is the roll capability of a high performance aircraft, and the navigational error allowance may be as low as 0.1 nautical mile per hour, the capability to accurately measure a very wide range of angular rates is necessary, for example, about $5 \times 10^8$ to 1 in the case cited. The problem of measuring a very wide range of angular rates such as indicated above utilizing gyroscopes has not been solved and this has been a major factor which inhibits the development of strapped-down navigation systems.

The ring laser is in many respects equivalent to a mechanical rate gyroscope. However, in addition to the properties of a rate gyro, it has characteristics which are uniquely suited to strapped-down inertial navigation systems for use as the angular rate sensors therein. The first of these characteristics is its inherently digital output in that above a predetermined threshold it provides an output frequency proportional to its input angular rate. Secondly, it has the ability to accurately measure angular velocity over an extremely wide range, and third, it has a highly accurate scale factor. However, a ring laser has one outstanding deficiency when used in a navigation system in that it has a threshold rate below which its output frequency is not proportional to its input rate and ultimately it goes to zero. This is due to a mode locking phenomenon inherent in ring lasers. The mode locking phenomenon precludes accurate measurement of low angular rates such as required in navigation systems. Various methods have been suggested for biasing the ring laser to at least partially overcome this deficiency such as the use of a Faraday bias cell in one leg of the ring to cause the zero frequency point to occur at some input rate outside the region of intended operation. However, the only method which does not degrade performance of the ring laser when utilized in a navigation system is a rotational bias which is sufficient to maintain the sensor well above its threshold level. A navigation system could be arranged for three axis sensing in which three ring lasers have their sensing axis at right angles with respect to each other and with each rotated about its respective sensing axis at some rate for biasing purposes. It will be appreciated, however, that this approach leads to mechanical complexities which is the very thing a strapped-down inertial navigation system seeks to avoid.

It is therefore an object of the present invention to provide apparatus for accurately measuring movement about a plurality of axes.

It is another object of the present invention to provide apparatus for sensing movement over a relatively wide range about a plurality of axes.

A further object of the present invention is to provide apparatus for sensing movement over a relatively wide range about a plurality of axes having a common compensation means.

It is another object of the present invention to provide inertial navigation apparatus for accurately sensing movement over a relatively wide range about a plurality of orthogonal axes.

It is another object of the present invention to provide inertial navigation apparatus for sensing movement about a plurality of axes having a self-adaptive compensation feature.

These and other objects of the present invention are accomplished by mounting a plurality of ring lasers, for example three, on respective ones of three orthogonally arranged planar surfaces which may be disposed to form a portion of a cube. Simultaneous rotation of the three ring lasers to overcome the threshold bias problem explained above is provided by rotating the ring lasers about a corner-to-corner diagonal of the cube thereby imparting to each of the ring lasers a component of the input angular rate equal to $$\frac{1}{\sqrt{3}}$$

times the input angular rate. Thus, a single rotational input serves to bias all three ring lasers simultaneously above their respective threshold and a significant mechanical simplification is achieved as compared with individual rotational biasing. The frequency outputs of the three ring lasers are fed to a suitable digital computer and the attitude updating computations are performed to maintain, in the computer, quantities which represent the attitude of the cube carrying the ring lasers with respect to a stable coordinate system. Three acceleration sensors are also mounted on the three faces of the cube with their sensing axes collinear with the sensing axis of the ring lasers. The outputs of the accelerometers are also fed to the computer to transform the acceleration information from the coordinates of the cube into the stable coordinate system in order that conventional inertial navigation computations can be performed.

Further, in accordance with the present invention, it will be appreciated that using the above approach it is not necessary to have an accurate measurement of the rotation rate used for the biasing operation because for the purpose of the navigational computation, the ring lasers themselves provide this information. The rate of rotation must be high enough to keep all the ring lasers above their respective thresholds although it is desirable that the rate be no greater than is required for this purpose because of computational speed considerations and ring laser scale factor accuracy considerations. Thus, means are provided by which the biasing rate input is automatically adjusted to maintain the lowest of the three ring laser output frequencies always above the threshold value. The rate is thus made adaptive to the requirements of the vehicle motion and a minimum effective biasing rate is continuously maintained.

These and other objects will become apparent by referring to the specification and drawings in which.

Figure 3:
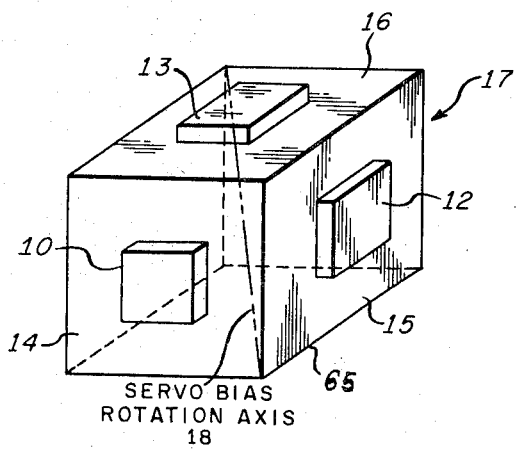
FIG. 3 is a schematic representation of a cube having rectangular ring lasers mounted on three orthogonal surfaces of the cube.
Figure 6:
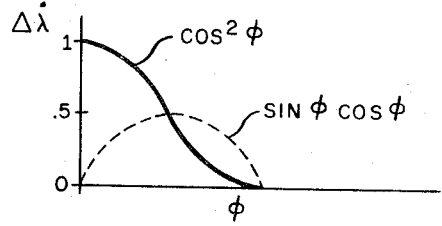
Figures 4B, 4C:
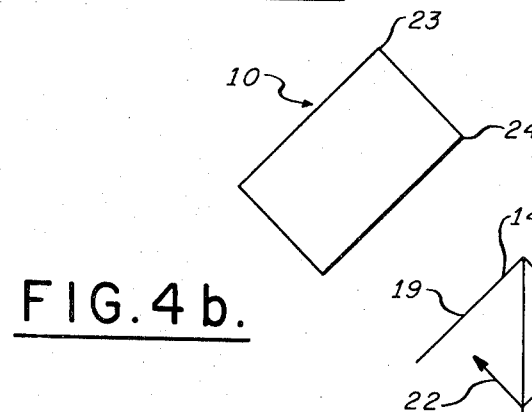
Figure 4A:
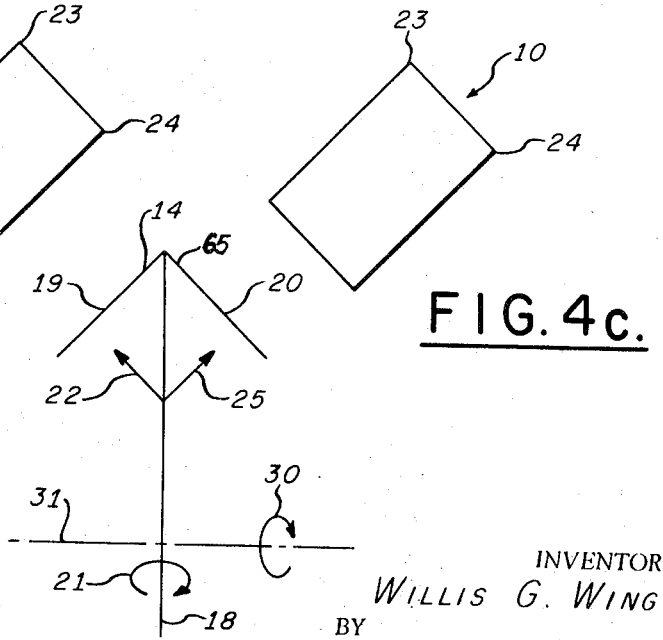

FIGS. 4a, b and c are schematic representations of the ring laser 10 of FIG. 3 when experiencing rotation;

FIG. 5 is a perspective view of an inertial navigation device utilizing triangular-shaped ring lasers mounted on orthogonally disposed surfaces of a truncated cube in accordance with the present invention; and FIG. 6 is a graph of the longitudinal rate error versus latitude.

In the present description, it will be understood that the term ring laser includes conventional planar type closed loop lasers in the form of polygons such as rectangles, squares, triangles, etc.

Figure 1:
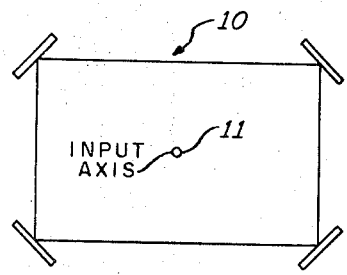
FIG. 1 is a schematic plan view of a planar closed loop ring laser.
Figure 2:
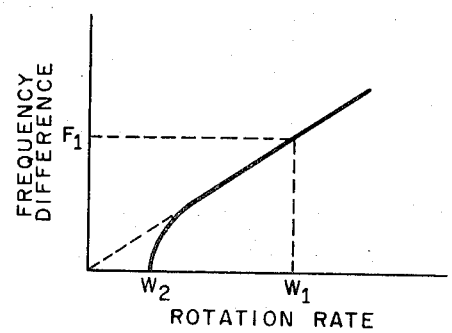
FIG. 2 is a graph representing frequency difference versus rotation rate.

Referring now to FIG. 1, when a ring laser 10 is rotated about its input axis 11 (perpendicular to the plane of the paper) in a clockwise direction, the cavity length is increased for the clockwise travelling light wave and decreased for the counterclockwise wave causing two discrete frequencies to oscillate in the ring laser 10. A portion of the energy in each of these beams may be extracted from the ring laser 10 and optically heterodyned. The resultant beat frequency is proportional to the frequency difference between the contrarotating beams which in turn depends on the rotation rate imparted to the ring laser 10. As shown in the graph of FIG. 2, at higher rotation rates, the beat frequency is linear with respect to the rotation rate, e.g., at rotation rate $W_1$, the frequency difference is $F_1$. At some low rotation rate determined by the physical characteristics of the ring laser 10, the beat frequency becomes non-linear and at rotation rate $W_2$, it suddenly decreases to zero. This is caused by mode locking wherein the contrarotating beams act upon one another in such a manner as to cause them both to oscillate at the same frequency although a differential cavity length exists. At rotation rates slightly above the mode locking point, the beat frequency is produced but it is not linearly related to the rotational rate. Consequently, some means must be employed to establish a differential cavity length for the contrarotating beams at low rotation rates and even in the absence of rotation about its input axis. This differential cavity length can be realized by deliberate rotation of the ring. Additional rotation of the vehicle on which the ring laser 10 is mounted, in the same direction as the deliberate rotation, will further increase the frequency difference between the light waves while rotation of the vehicle in the opposite direction will reduce the frequency difference. The deliberate rotation must, therefore, be at a sufficiently high rate to insure that the added vehicle rate will not reduce the difference frequency to the nonlinear region immediately above the mode locking point if an accurate indication of angular rotation is to be obtained.

As shown in FIG. 3 in accordance with the present invention, a plurality of ring lasers 10, 12 and 13, each substantially identical with respect to each other, are mounted on respective planar surfaces 14, 15 and 16 of a cube 17. The surfaces 14, 15 and 16 are mutually perpendicular with respect to each other and define a cube 17. To provide for simultaneous rotation of the ring lasers 10, 12 and 13, the cube 17 upon which they are mounted is rotated about a corner-to-corner diagonal axis 18 known as the servo bias rotation axis.

The operation of the present invention will now be described with respect to FIGS. 4a, b and c when utilizing a rectangular ring laser mounted and rotated as described with respect to FIG. 3.

FIG. 4a depicts a plan view of the servo bias axis 18 and two faces 14 and 65 of the cube 17 (the cube surfaces 14 and 65 are normal to the paper as shown only when the servo bias axis 18 is canted a precise angle with respect to the plane of the paper). FIG. 4b shows the ring laser 10 mounted on the cube surface 14 in position 19 as viewed from the servo bias axis 18. FIG. 4c shows the orientation of the ring laser 10 as viewed from the servo bias axis 18 after the cube surface 14 has been rotated to position 20. Rotation of the servo bias axis 18 in the direction of the arrow 21 imparts a component of rotation 22 to ring laser 10 in position 19 such that the cavity is shortened for the light wave travelling in the direction from the corner mirror 23 to the corner mirror 24. When the cube surface 14 reaches position 20, a component 25 of the servo bias rotation still shortens the cavity for the light wave directed from mirror 23 to mirror 24. Thus, the bias imparted to the ring laser 10 does not reverse as the cube 17 rotates about the servo bias axis 18.

When the cube 17 experiences a rotation indicated by the arrow 30 about an axis 31 normal to the servo bias axis 18, with the ring laser 10 in position 19, the rotation shortens the cavity for the light waves travelling from mirror 23 to mirror 24 but with the ring laser 10 in position 20, the rotation lengthens the cavity for the aforementioned light wave. Hence, if the servo bias alone produces a beat frequency of 100 c.p.s. and the rotation produces a beat of 20 c.p.s., the total beat is 120 c.p.s. for the ring laser 10 in position 19 and 80 c.p.s. for the ring in position 20, i.e., one-half the differential beat frequency is $$\frac{120-80}{2}=20 \text{ c.p.s.}$$

A drift rate error inherent in a ring laser which may be represented by a vector component at right angles to the servo bias axis 18 and which varies slowly compared to the time for one rotation thereof will average to zero over a complete rotation. In the foregoing example, therefore, if the drift normal to the servo bias axis 18 increases the beat frequency to 125 c.p.s. when the ring laser 10 is in position 19 and decreases it to 85 c.p.s. when the ring laser 10 is in position 20, one-half the differential beat frequency is still $$\frac{125-85}{2} = 20 \text{ c.p.s.}$$

Referring now to FIG. 5, a preferred embodiment of the present invention will now be described. A frame 35 is in the form of a portion sliced from a cube 17 by a plane perpendicular to a corner-to-corner diagonal 36 which also serves as the rotation or servo bias axis. Three mounting faces 37, 38 and 39, the latter not being visible, are thus provided in the form of three mutually orthogonal surfaces of the truncated cube 17. The mounting surfaces 37, 38 and 39 each have like angles with respect to the axis of rotation 36. Three ring lasers 40, 41 and 42, the latter not being visible, are mounted on the respective surfaces 37, 38 and 39. The ring lasers 40, 41 and 42 may each be in the form of triangles as shown. The three ring lasers 40, 41 and 42 provide output beat frequencies $F_1$, $F_2$ and $F_3$, respectively, to a digital computer 43 to provide for calculations to update information regarding the attitude of the truncated cube 17 with respect to a stable coordinate system. The digital computer 43 may comprise, for example, a direction cosine computer, a coordinate transformation device, and a navigational computer in a conventional manner which provides navigation position signals such as latitude and longitude, in a manner to be described.

The three ring laser frequencies $F_1$, $F_2$ and $F_3$ are also connected to three frequency discriminators 44, 45 and 46, respectively, which provide D.C. voltages proportional to the deviations of the three ring laser output frequencies $F_1$, $F_2$ and $F_3$ from the desired operating frequency $F_0$. It will be understood that a positive D.C. voltage is provided for a frequency below the desired frequency $F_0$ for purposes of discussion. The three D.C. voltages thus developed are connected to respective diodes 47, 48 and 49 which have their outputs connected through a resistor 50 to a negative D.C. bias source 51. The output of the circuit 52 consisting of the diodes 47, 48 and 49, the resistor 50 and the negative D.C. bias source 51 is a D.C. voltage equal to the most positive of the three outputs from the frequency discriminators 44, 45 and 46.

The output voltage of the diode matrix circuit 52 is connected to an amplifier 53 which provides power amplification to a servomotor 54 that is connected to drive the frame 35 about the rotation axis 36. The signal from the amplifier 53 drives the servomotor 54 so as to change the rotational rate, in a manner to tend to reduce to zero the input to the amplifier 53. When this has been done, none of the frequency discriminator outputs will be positive and none of the ring laser output frequencies will be below the preselected value $F_0$. It will be appreciated that angular motions of the vehicle may require that one or more of the ring laser frequencies become greater than $F_0$ although the servo loop will operate to maintain the lowest frequency always close to $F_0$.

Accelerometers 60, 61 and 62, the latter not being visible, are also mounted on respective faces 37, 38 and 39 of the frame 35 to provide information regarding the three components of linear acceleration $A_1$, $A_2$ and $A_3$ of the frame 35 with respect to the sensitive axes of the ring lasers 40, 41 and 42 in order that the accelerations sensed thereby are in laser coordinates. The acceleration signals $A_1$, $A_2$ and $A_3$ are also connected to the digital computer 43 for the purpose of making navigational computations as previously described in order to provide from the digital computer 43 navigational position information such as latitude and longitude for example.

It will be appreciated that the orientation of the rotation axis 36 with respect to the vehicle upon which it is mounted is arbitrary. However, there are two preferred orientations, one of these orientations is along the roll axis of the vehicle. The roll axis usually involves the highest angular rates and the servo loop action will tend to stabilize the frame 35 against roll rates if this orientation is utilized.

As was explained previously, the servo bias rotation must be high enough to assure that the additional vehicle rates will not reduce the beat frequency to the mode locking point. A constant, high servo bias rotation is undesirable, however, because it increases scale factor error which is related to the wavelength (λ) of the light wave and ring perimeter (P) and area (A). The beat frequency is proportional to $WA\lambda/P$. If $A/P$ is a fixed value D, the frequency split is dependent only on W. If D increases or decreases by an amount ΔD, the frequency split is determined by $WD \pm W\Delta D$. Hence, for a particular scale factor error the beat frequency error is directly proportional to W. The adaptive mechanism permits the use of a nominal servo bias rotation slightly above the nonlinear mode locking region thereby minimizing scale factor error. If the vehicle rotates in a manner such as to drive any one of the rings into the mode locked region, the adaptive mechanism increases the servo bias rotation correspondingly. As a result scale factor errors are increased only during high vehicle angular rate transient periods. If the servo bias rotation axis 36 is oriented along the vehicle yaw axis and the largest vehicle angular rates still occur about the roll axis, the adaptive mechanism may nevertheless be employed but the servo bias rotation axis 36 will have to be rotated at a faster rate to compensate for rolling motion.

To fully appreciate the second of the preferred orientations of the axis 36, it is desirable to discuss another advantage of the present invention which has not been previously discussed.

Any of the ring laser errors can be considered as having two components one along axis 36 and the other normal to the rotation axis 36. If the errors vary slowly enough not to change significantly during the time of one rotation about the rotation axis 36, then the error components normal to the rotation axis 36 will be averaged to zero and only the components along the rotation axis 36 will result in a cumulative error in knowledge of the attitude of the frame 35. It is thus evident that a preferred orientation of the rotation axis 36 is that in which the cumulative error has the least influence on navigational accuracy; in most instances this will be along the vehicle azimuth axis.

In a nonpendulous gyrocompass containing electromechanical rate gyros, the operation is based on aligning the input axis east-west in the horizontal plane. This corresponds to aligning the other gyro axes (spin axis and output axis) with the north-south and local vertical directions. A gyrocompassing inertial navigation system employing an orthogonal triad of ring lasers would preferably be oriented with the servo bias rotation axis 36 oriented within some predetermined tolerance of the local vertical. The present invention is not concerned with gyrocompassing but with other advantages associated with servo bias rotation axis 36 orientation along the vehicle yaw axis. Assume that the computer stable axes correspond to the local, vertical, east and north directions and that drift rates about these axes are represented by $W_D$, $W_E$ and $W_N$. It is known to those skilled in the inertial navigation field that a steady state latitude displacement error $\Delta\phi$ (having an angle dimension, i.e., radians, arc sec) is produced by these drift rates.

$$\Delta\phi = -\frac{W_D \cos\phi}{\Omega} + \frac{W_N \sin\phi}{\Omega}$$

where $\Omega$ is earth's rate and $\phi$ is latitude. This expression is part of an undamped second order differential equation which has a sinusoidal steady state solution. The drift rates also produce a longitudinal rate error $\Delta\lambda$ (also having an angle dimension).

$$\Delta\dot\lambda = -W_D \sin\phi - W_N \cos\phi$$

For a vertical alignment of the servo bias rotation axis 36, the servo bias is affected by the vertical drift rate $W_D$ so $$\Delta\phi = -\frac{W_D \cos\phi}{\Omega}$$

and $$\Delta\dot\lambda = -W_D \sin\phi$$

For a roll axis (horizontal) alignment of the servo bias rotation axis 36, the servo bias is affected by the northerly drift rate $W_N$ so $$\Delta\phi = \frac{W_N \sin\phi}{\Omega}$$

and $$\Delta\dot\lambda = -W_N \cos\phi$$

The latitude error $\Delta\phi$ is the same over all parts of the earth's surface except that it depends on $W_D$ for a vertical servo bias rotation axis 36 and on $W_N$ for a north pointing horizontal axis 36. Since the lines of longitude converge at the poles, the longitude rate error $\Delta\dot\lambda$ must be multiplied by $\cos\phi$ to obtain longitude rate error at various points on the earth's surface. After multiplying by $\cos\phi$ the longitude rate error for a vertical servo bias rotation axis 36 is $$\Delta\dot\lambda = -W_D \sin\phi \cos\phi$$

and for a horizontal axis 36

$$\Delta\dot\lambda = -W_N \cos^2\phi$$

These curves are plotted in FIG. 6 which indicates the error propagation is less for the vertical orientation.

It is evident that a choice between the two preferred orientations of the axis 36 depends upon an examination of error propagation in the particular application.

Continuous rotation in one direction for biasing purposes can result in an accumulative error in knowledge of the frame attitude because of inaccuracies in knowledge of the scale factors of one or more of the ring lasers 40, 41 and 42. This can be overcome by periodic reversal of the sense of the biasing rotations; such a reversal may be accomplished by a reversal of the sensing of the signal to the motor 54. Because the rotational sense for each ring laser represented by an increase in its frequency output is the same as the sense of the biasing input to that ring laser, it is necessary that the computer 43 be provided with information as to the direction of the biasing input (information on the sensing of the error signal to the motor 54) so that it can put a proper interpretation on the ring laser outputs.

Although for navigational purposes it is not required that information be provided regarding the angle between the vehicle and the frame 35 for rotation about axis 36, such information may be desired for other purposes (such as vehicle attitude control). If this is desired, then an angular position pick-off can be provided on axis 36; information from such a pick-off, together with information available in the digital computer 43 regarding attitude of the frame 35 with respect to a stable coordinate system, can be used to obtain information on the attitude of the vehicle with respect to the same stable coordinate system.

What is claimed is:
1. Apparatus for sensing movement above a plurality of axes defining surfaces of a geometric figure, including:
   (a) a plurality of ring laser means,
   (b) each of said ring laser means being mounted on respective ones of said surfaces and responsive to movement about said axis respectively,
   (c) each of said ring laser means having contrarotating beams propagating therein and tending to have a common threshold below which its output is not proportional with respect to its input, and
   (d) common drive means for simultaneously revolving said plurality of ring laser means about a common axis such that for input rotations which are to be measured the components thereof represented by vectors oriented normal to said common axis oppositely affect the individual beams of said contrarotating beams during successive half revolutions whereas for ring laser internal drift having a periodic reversal time substantially greater than the time for one revolution the components thereof represented by vectors oriented normal to said common axis identically affect the individual beams of said contrarotating beams during successive half revolutions thereby enabling said input rotations to be discriminated from said normally oriented draft/components,
      the revolving rate provided by said common drive means being sufficient to cause said contrarotating beams to exceed said threshold.
2. Apparatus of the character recited in claim 1 further including:
   (a) three frequency discriminating means responsive to outputs from said three ring laser means for providing signals representative of the difference between each of said ring laser output frequencies and a nominal frequency,
   (b) means responsive to said three difference frequency signals for providing a signal representative of the minimum difference frequency signal, and
   (c) motor control means responsive to said minimum difference frequency signal for controlling said common drive means to tend to maintain the lowest laser output difference frequency equal to said nominal frequency.
3. In an inertial navigation system,
   (a) a member having three orthogonal planar surfaces disposed at a common angle with respect to an axis of rotation,
   (b) three ring laser means,
   (c) each of said ring laser means mounted on respective ones of said surfaces and responsive to movement about mutually orthogonal sensing axes for providing signals representative of said movements,
   (d) each of said ring laser means tending to exhibit an undesirable mode locking phenomenon below a substantially common threshold within the desired operating range, and
   (e) common means for simultaneously driving all of said ring laser means around said axis of rotation at the same speed for eliminating said mode locking phenomenon within the desired operating range.
4. A system of the character recited in claim 3, further including:
   (a) three frequency discriminating means responsive to outputs from said three ring laser means for providing signals representative of the difference between each of said ring laser output frequencies and a nominal frequency,
   (b) means responsive to said three difference frequency signals for providing a signal representative of the minimum difference frequency signal, and
   (c) motor control means responsive to said minimum difference frequency signal for controlling said common drive means to tend to maintain the lowest laser output difference frequency equal to said nominal frequency.

5. Apparatus of the character recited in claim 1 in which said plurality of axes are orthogonally disposed with respect to each other defining respective orthogonal planar surfaces of a cube, said plurality of ring laser means includes at least 3 planar ring lasers each mounted on respective ones of said planar surfaces and responsive to movement about said orthogonal axes respectively, and said common axis is aligned coaxially with a diagonal of said cube so that it is at an equal angle with respect to each of said planar surfaces.

References Cited
UNITED STATES PATENTS 3,373,650  3/1968  Killpatrick _____ 88—14EG RONALD L. WIBERT, Primary Examiner P. K. GODWIN, JR., Assistant Examiner U.S. Cl. X.R.

331—94.5; 74—5.34